United States Patent
Park

(10) Patent No.: US 7,681,277 B2
(45) Date of Patent: Mar. 23, 2010

(54) AUTOMOTIVE WIPER

(76) Inventor: Se-Heon Park, 406-203 Saetbyeol maeul, Bundang-dong 39, Bundang-gu, Seongnam-si, Gyeonggi-do (KR)

( * ) Notice: Subject to any disclaimer, the term of this patent is extended or adjusted under 35 U.S.C. 154(b) by 1190 days.

(21) Appl. No.: 11/229,803

(22) Filed: Sep. 20, 2005

(65) Prior Publication Data
US 2006/0090281 A1 May 4, 2006

(30) Foreign Application Priority Data

Nov. 24, 2004 (KR) ............................ 2004-0096794
Nov. 24, 2004 (KR) ............................ 2004-0096795

(51) Int. Cl.
*B60S 1/38* (2006.01)
(52) U.S. Cl. .............................. 15/250.43; 15/250.201; 15/250.451
(58) Field of Classification Search .............. 15/250.43, 15/250.4, 250.41, 250.361, 250.44, 250.451, 15/250.23
See application file for complete search history.

(56) References Cited

U.S. PATENT DOCUMENTS

| | | | | | |
|---|---|---|---|---|---|
| 2,045,143 A | * | 6/1936 | Horton | ................... | 15/250.33 |
| 2,624,903 A | * | 1/1953 | Krohm | ................... | 15/250.33 |
| 2,641,007 A | * | 6/1953 | Krohm | ................... | 15/250.33 |
| 3,751,754 A | * | 8/1973 | Quinlan et al. | ........... | 15/250.43 |
| 3,874,019 A | * | 4/1975 | Speth | ...................... | 15/250.32 |
| 4,553,283 A | * | 11/1985 | Speth | ...................... | 15/250.32 |
| 5,465,454 A | * | 11/1995 | Chang | .................... | 15/250.41 |
| 5,497,528 A | * | 3/1996 | Wu | ......................... | 15/250.46 |
| 5,625,919 A | * | 5/1997 | Jeffer | ..................... | 15/250.41 |
| 6,772,470 B2 | * | 8/2004 | Zimmer | .................. | 15/250.21 |
| 2006/0090281 A1 | * | 5/2006 | Park | ....................... | 15/250.43 |
| 2007/0000084 A1 | * | 1/2007 | Park | ....................... | 15/250.48 |
| 2007/0044266 A1 | * | 3/2007 | Park | ...................... | 15/250.201 |

* cited by examiner

*Primary Examiner*—Lee D Wilson
(74) *Attorney, Agent, or Firm*—Lowe Hauptman Ham & Berner, LLP

(57) ABSTRACT

An automotive wiper includes a frame supporting a blade. The frame is attached via an adapter to a wiper arm that presses and moves the wiper against and across the windshield. The wiper also includes a tension spring that is inserted along a rail portion of the blade for evenly distributing load along the blade onto the windshield. The adapter is disposed in the direction of a vertical axis (H) of the frame at a central portion thereof. The frame is offset by an adjustable angle θ from a horizontal axis (S) of the adapter taken at a sectional view of the wiper, whereby the frame is offset by an angle θ1 from its vertical axis, due to an offset of the frame and the adapter when the blade is pressed in its entirety against a windshield of a vehicle.

10 Claims, 6 Drawing Sheets

[FIG. 1]
PRIOR ART
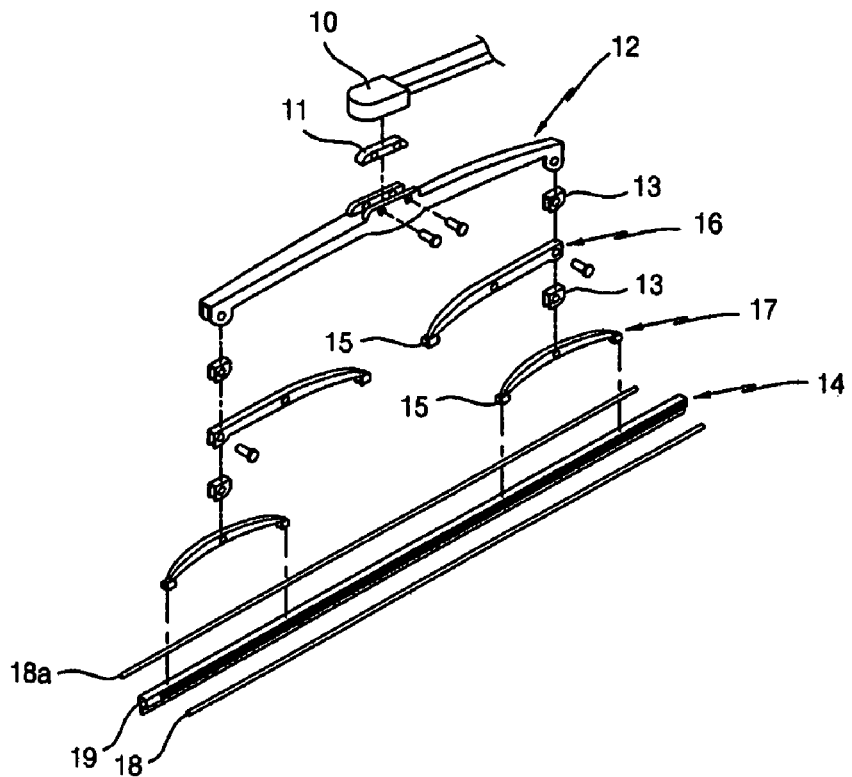
[FIG. 2]
PRIOR ART
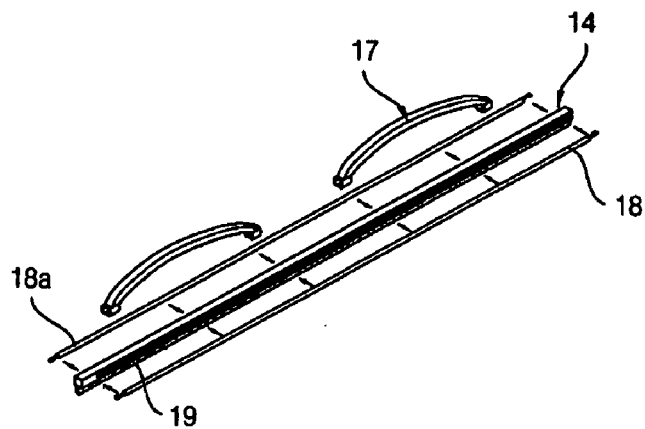

[FIG. 3]
PRIOR ART
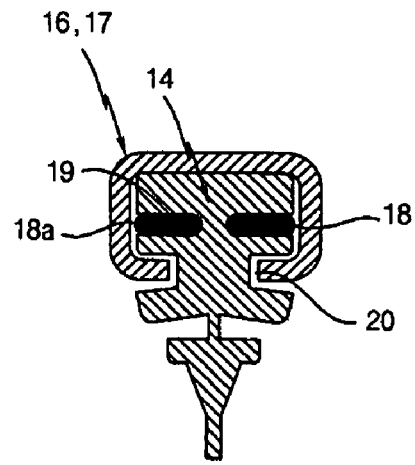
[FIG. 4]
PRIOR ART
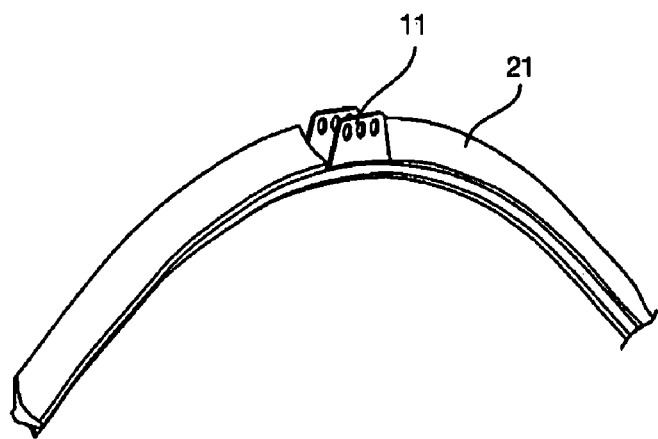

[FIG. 5]
PRIOR ART
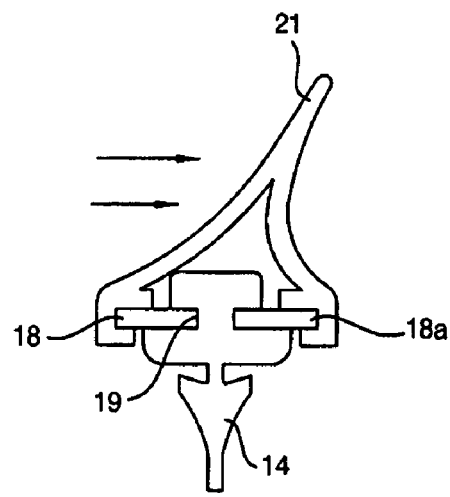
[FIG. 6a]
PRIOR ART
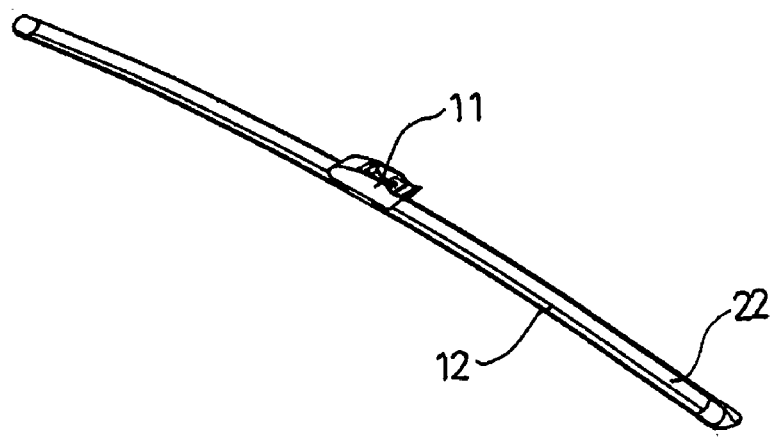

[FIG. 6b]
PRIOR ART
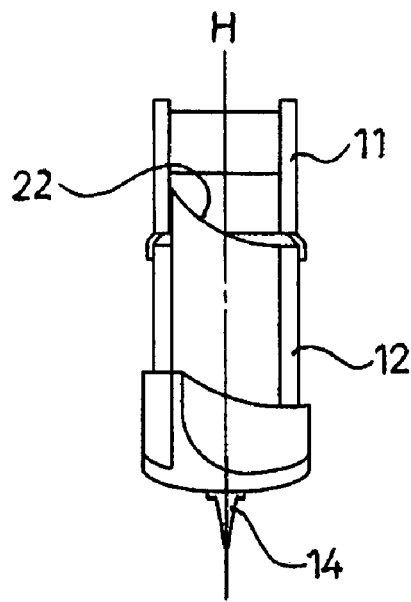
[FIG. 7]
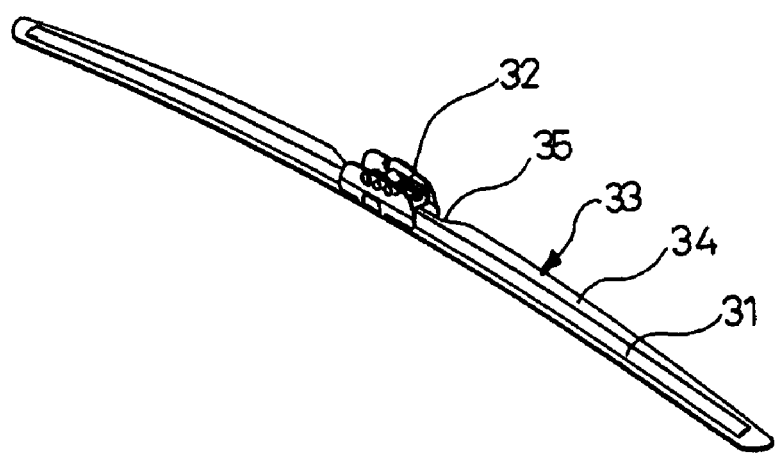

[FIG. 8a]
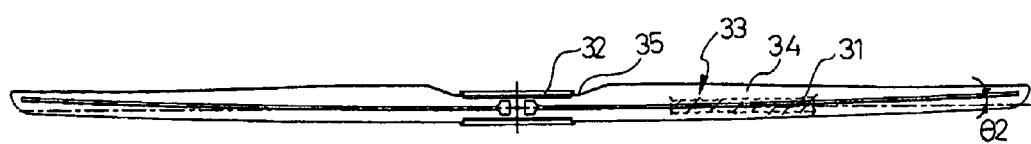
[FIG. 8b]
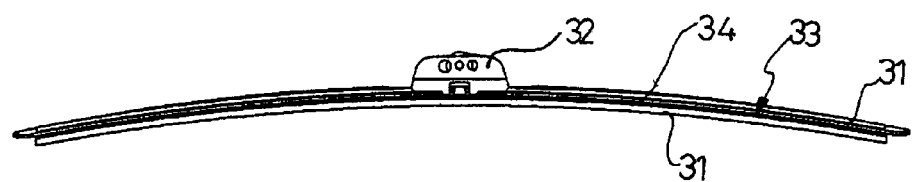

[FIG. 9]
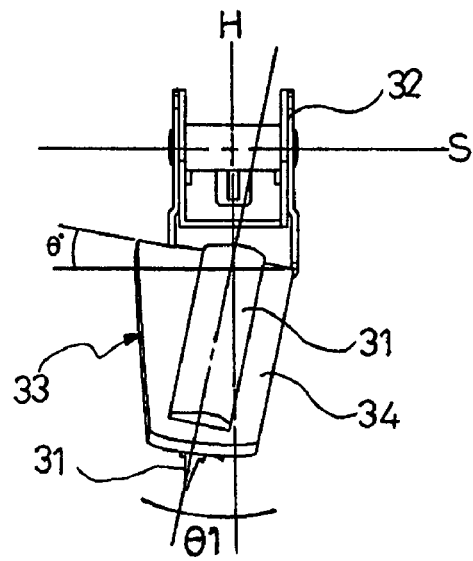
[FIG. 10]
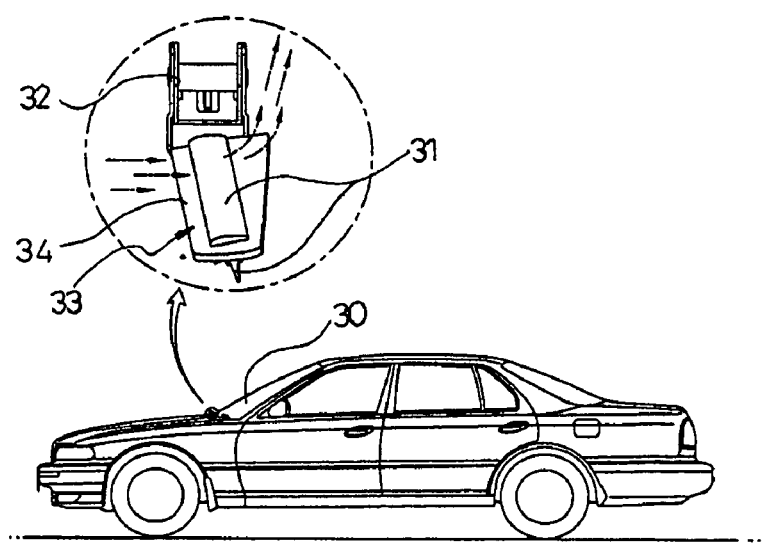

AUTOMOTIVE WIPER

BACKGROUND OF THE INVENTION

1. Field of the Invention

The present invention relates to an automotive wiper, and more particularly, to an automotive wiper capable of functioning as a spoiler.

2. Description of the Related Art

An automotive wiper is operated by a wiper motor through a mechanical linkage that moves the wiper arm back and forth in a predetermined arc. Disposed on the end of the wiper arm is a detachably mounted wiper frame to which a wiper blade made of rubber is attached.

Conventional wipers attached to wiper arms include a skeletal frame and a blade portion mounted on the frame and contacting a windshield to wipe it in a pendular movement, as shown in FIGS. 1 through 3.

A conventional wiper 10 includes: a main frame 12 having an adapter thereon for mounting the wiper 10; a first frame 16 symmetrically mounted on rivet joints 13 at either end of the main frame 12, and having a blade bracket 15 for evenly distributing load on the blade 14 and holding the blade 14 inserted therein; a second frame 17 symmetrically mounted on rivet joints 13 at either end of the first frame 16, and having blade brackets 15 on either end thereof for evenly distributing load on the blade 14 and holding the blade 14 inserted therein; a blade 14 having a rail portion 19 formed thereon along which resilient tension springs 18 and 18a having a predetermined elasticity are inserted, the resilient tension springs applying a predetermined load furnished by the first and second frames 16 and 17 along the length of the blade 14 so that the blade 14 presses evenly against a windshield when wiping it; and a metallic tension spring 18 and 18a inserted along the length on either side of the blade 14 to support the load furnished by the first and second frames 16 and 17.

Here, in order for the main frame 12 to transmit the movement of the wiper arm 10 to an arcuate movement of the blade 14, the wiper 10, blade 14, and the tension springs 18 and 18a that provide resilience to the blade 14 converge at one point so that they move in unison according to the movement of the wiper 10. Also, the first and second frames 16 and 17 evenly distribute load furnished by the main frame 12, and, along with the main frame 12, are press-formed to have holes formed therein to facilitate water drainage and reduce weight.

The blade has a groove 20 running lengthwise therealong for guiding the blade brackets 15 of the first and second frames 16 and 17, and a separate rail portion 19 for accommodating the tension springs 18 and 18a that provide resilience to the blade 14.

In the structure of this type of wiper, because the load on the blade is applied at certain points on the blade, it is unevenly distributed along the length of the blade. This unevenness causes premature wear of blade areas that are more compressed, while less compressed areas are prone to streak or overshoot the windshield glass underneath.

The wiper shown in FIGS. 4 and 5 does not have a main frame supporting a metal frame separately from a blade, but has tension springs inserted in the blade 14, over which a rubber cover 21 covers the unit.

That is, the rail portion 19 is formed along the lengths on either side of the blade 14, tension springs 18 and 18a are inserted into each rail portion, and a rubber cover 21 that functions as a spoiler is then inserted over the unit to conceal the tension springs 18 and 18a.

The problem with the foresaid wiper is that the aggregate tension of the two tension springs 18 and 18a and the rubber cover 21 necessitate the wiper arm maintaining an increased load on the wiper for the wiper to be operationally effective, unduly stressing the mechanism. Also, this type of wiper is not interchangeable with existing wiper arms on vehicles that have a tension preset for the previously mentioned multi-point-type wiper blade. Furthermore, because the wiper requires the rubber spoiler-cum-cover to complete the formation thereof, the latter item cannot be omitted.

Another conventional type of wiper, shown in FIGS. 6a and 6b, is formed with a separate spoiler 22 fitted at the top of the rubber blade that the tension springs 18 and 18a are inserted into. This type of blade prevents vibration, while maintaining a secure and even contact with a windshield.

However, because this wiper structure has an adapter 11 and frame 12 disposed in a vertical axis (H) direction of the adapter 11, the frame 12 or the tension spring by themselves cannot function as a spoiler. Therefore a separately formed spoiler is required, complicating the overall structure, and creating the possibility of vibration or judder caused by the spoiler and wind noise when pressed against a windshield.

SUMMARY OF THE INVENTION

The present invention is designed to solve the problems of the prior art, and therefore an object of the invention is to provide an automotive wiper having a frame or tension spring composing the skeletal frame of the wiper functioning as a spoiler without making structural changes or additions to the frame or tension spring.

Another object of the invention is to provide an automotive wiper that does not disengage or judder and securely contacts a windshield by functioning as a spoiler.

A further object of the invention is to provide an automotive wiper capable of maintaining an even distribution of load across the blade onto a windshield to improve its wiping ability and prevent judder or disengagement while driving without the use of an added spoiler.

In order to accomplish the above objects, the present invention provides an automotive wiper including a frame supporting a blade that closely contacts a surface of an automotive windshield and attached to a wiper arm for pressing and operating the wiper against and across the windshield via an adapter, and a tension spring having a predetermined tension and inserted along a rail portion of the blade for evenly distributing load along the blade onto the windshield, wherein the improvement includes: an adapter disposed perpendicularly to a longitudinal axis of the frame at a central portion thereof for a wiper arm to mount to, the frame being offset by an angle θ from a horizontal axis taken at a sectional view of the wiper, whereby the frame is offset by an angle θ1 from a perpendicular axis, due to an offset of the frame and the adapter when the blade is pressed in its entirety against a windshield of a vehicle.

In addition, an automotive wiper having a frame supporting a blade that closely contacts a surface of an automotive windshield and attached to a wiper arm for pressing and operating the wiper against and across the windshield via an adapter, and a tension spring having a predetermined tension and inserted along a rail portion of the blade for evenly distributing load along the blade onto the windshield, wherein the improvement includes: a tensile member formed along one piece and extending symmetrically to both ends from a central portion, the tensile member being both a single one-piece tension spring and a skeletal structure for mounting to a wiper arm; and an adapter disposed perpendicularly to a longitudinal axis of the tensile member at a central portion thereof for a wiper arm to mount to, the tensile member being offset by an angle θ from a horizontal axis taken at a sectional view of the wiper, whereby the tensile member is offset by an angle θ1 from a perpendicular axis, due to an offset of the tensile member and the adapter when the blade is pressed in its entirety against a windshield of a vehicle.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 1 is an exploded perspective view of a conventional automotive wiper;

FIG. 2 is an exploded perspective view showing the assembly of the tension springs of a conventional wiper blade;

FIG. 3 is a sectional view showing the assembly of the tension springs of a conventional wiper blade;

FIG. 4 is a perspective view of another type of conventional automotive wiper;

FIG. 5 is a sectional view of the automotive wiper of FIG. 4;

FIG. 6a is a perspective view of yet another type of conventional automotive wiper;

FIG. 6b is a sectional view of the automotive wiper of FIG. 6a;

FIG. 7 is an perspective view of an automotive wiper according to the present invention;

FIG. 8a is a top view of the automotive wiper of FIG. 7;

FIG. 8b is a side view of the automotive wiper of FIG. 7;

FIG. 9 is a perspective view showing the automotive wiper of FIG. 7 from a different viewpoint; and FIG. 10 is a perspective view showing an application of the automotive wiper of FIG. 7.

DETAILED DESCRIPTION OF THE INVENTION

Hereinafter, a preferred embodiment of the present invention will be described in detail with reference to FIGS. 7 through 10, which show embodiments of the present invention.

In FIGS. 7 through 10, the part numbers 33 and 34 refer to the frame 33 and the tensile member 34. The frame 33 is shown in the first embodiment, and the tensile member 34 is shown in the second embodiment.

The automotive wiper, according to the first embodiment of the present invention, includes a frame 33 for pressing a blade 31 against a vehicle's windshield 30 and attached via an adapter 32 to a wiper arm that presses and moves the wiper against and across the windshield 30; and a tension spring installed along a rail portion having a predetermined tension for evenly distributing load along the blade 31 onto the windshield.

In further detail, the adapter 32, for installing the wiper to the wiper arm, is disposed at the central portion of the frame 33 in a vertical axis (H) direction of the frame 33, as shown in FIG. 9. The frame 33 may be offset by an angle θ from a horizontal axis (S) taken at the front of the wiper with respect to the adapter 32, where the frame 33, due to the offset of the frame 33 and the adapter 32, is offset by an angle θ1 from the vertical axis (H) when the blade is pressed in its entirety against a vehicle's windshield 30, so that the wiper can more pervasively contact the windshield 30.

Here, when the wiper frame 33 is pressed against the vehicle's windshield, the leading edge is disposed lower on the glass than the trailing edge, and the adapter 32 and the frame 33 can be adjusted to be offset at an angle from 5° to 50° from a perpendicular axis.

The automotive wiper, according to a second embodiment of the present invention, has the tensile member forming the frame and tension spring in one piece which may also include the adapter. Referring to FIGS. 7 through 9, the wiper includes a tensile member 34 extending in one piece from a center thereof to have mutually symmetrical ends, has an adapter 32 to fit on a wiper arm, and is formed of a single tension spring to compose the skeletal structure of the frame. The adapter 32, for installing the wiper to the wiper arm, is disposed at the central portion of the tensile member 34 in a vertical axis (H) direction of the tensile member 34, and the tensile member 34 may be offset by an angle θ from a horizontal axis (S) taken at the front of the wiper with respect to the adapter 32, where the tensile member 34, due to the offset of the tensile member 34 and the adapter 32, is adjustably offset by an angle θ1 from the vertical axis when the blade is pressed in its entirety against a vehicle's windshield 30, so that the wiper can more pervasively contact the windshield 30.

Because the tensile member 34 deviates from a straight line, the wiper blade 31 may be formed with the same curvature with an angle θ2 from a straight longitudinal axis thereof, so that it can retain its perpendicularity to and contact with a windshield.

When the tensile member 34 is pressed against the vehicle's windshield 30, the leading edge is disposed lower on the glass than the trailing edge, and the adapter 32 and the tensile member 34 can be adjusted to be offset at an angle from 5° to 50° from a perpendicular axis. That is, the adapter 32 and the tensile member 34 can be freely adjusted to deviate from a perpendicular axis and change the angle of deflection.

The tensile member 34 becomes narrower towards either end, and its central portion where the adapter 32 resides has a recess 35 in order to reduce negative pressure.

The rubber blade, 31 mounted to the tensile member 34, may be angled according to the offset of the tensile member 34 instead of being laterally symmetrical, so that the blade can contact a windshield more firmly and have increased wiping ability.

Also, the wiper blade 31 may be formed in a curvature on the tensile member 34 to deviate from a straight line along with the tensile member 34, so that it can retain its perpendicularity to and contact with a windshield.

The wipers described in embodiments of the present invention thus far have the following common characteristics. First, by pivoting the adapter portion that couples to the wiper arm on the frame so that a certain angle is maintained between the frame acting as a tension spring and a windshield, the frame also functions as a spoiler for oncoming air, as shown in FIG. 10.

Second, because the adapter has been bent at an angle, although a 90° angle cannot be maintained between the wiper blade and the windshield surface, the rubber wiper blade maintains an angle close to 90° in relation to the windshield, so that the blade is kept securely in close contact with the windshield in order to maintain superior wiping ability.

Third, although the blade is curved and attached to the frame so that it deviates from a straight line, it is securely and firmly pressed against the windshield, with its end portion contacting the windshield at an angle close to 90°.

The automotive wiper, according to the first embodiment of the present invention, pivots the adapter 32 on a frame of a conventional wiper structure at a predetermined angle from the frame 33, as shown in FIGS. 7 through 9.

The structure includes a frame 33 for holding a blade 31 that is pressed against the surface of a vehicle's windshield 30, the frame 33 being attached to a wiper arm (for pressing and moving the blade 31 against and across the windshield 30) via an adapter, and a tension spring having a predetermined elasticity inserted along a rail portion of the blade 31 for evenly distributing load along the blade 31 on the windshield 30.

As shown in FIG. 9, the adapter 32, for installing the wiper to the wiper arm, is disposed at the central portion of the frame 33 in a vertical axis (H) direction of the frame 33, and the frame 33 is offset by an angle @ from a horizontal axis (S) taken at the front of the wiper with respect to the adapter 32 as seen in FIG. 9 a first arm being longer than a second arm which is connected to frame 33. The first arm is connected to tensile member 34 and a second arm connected to the frame 33, where the frame 33 functions as a spoiler so that oncoming air easily bypasses it.

Here, by adjusting the angle between the frame 33 and the adapter 32, the frame 33 is offset by an angle θ1 from the vertical axis (H) when the blade is pressed in its entirety against a vehicle's windshield 30, so that the wiper can more pervasively contact the windshield 30. When the frame 33 is pressed against the vehicle's windshield, its leading edge is disposed closer to the glass than its trailing edge, and the adapter 32 and the frame 33 can be adjusted to be offset at an angle from 5° to 50° from a perpendicular axis.

Referring to FIGS. 7 through 9, the automotive wiper according to the second embodiment of the present invention has a tensile member 34 forming the frame and tension spring in one piece that also includes the adapter 32 that is bent with respect to the frame.

As shown in FIGS. 7 through 9, the wiper includes a tensile member 34 extending in one piece from a center thereof to have mutually symmetrical ends, has an adapter 32 to fit on a wiper arm and disposed at a predetermined angle relative to the frame, and being formed of a single tension spring to compose the skeletal structure of the frame. As in the first embodiment, the adapter 32 is disposed at the central portion of the tensile member 34 in a vertical axis (H) direction of the tensile member 34, and the tensile member 34 may be adjustably offset by an angle θ from a vertical axis (H) taken at the front of the wiper with respect to the adapter 32, where the tensile member 34 functions as a spoiler to allow oncoming air to easily bypass it.

Due to the offset of the tensile member 34 and the adapter 32, the tensile member 34 is offset by an angle θ1 from the vertical axis when the blade is pressed in its entirety against a vehicle's windshield 30, so that the wiper can more pervasively contact the windshield 30.

The rubber wiper 31 mounted on the tensile member 34 is offset from a vertical axis of the tensile member 34, but maintains an almost vertical disposition in relation to the windshield 30 surface, having a curvature angle θ2.

The tensile member 34, as in the first embodiment, has its leading edge disposed closer to the windshield 30 than its trailing edge; and the adapter 32 and the tensile member 34 can be freely adjusted to be offset at an angle from 5° to 50° from a perpendicular axis when the tensile member 34 is pressed against the vehicle's windshield. That is, an angle adjustment can be freely made by simply adjusting the deflection angle of the adapter 32 and tensile member 34 with respect to a vertical axis.

The tensile member 34 narrows towards its ends, and may have a recess 35 for reducing negative pressure in its central portion where the adapter 32 resides. Such a structure is suitable for sustaining a stable airflow around it and balancing load.

The rubber blade 31 mounted on the tensile member 34 has an offset angle in accordance to the angle of the laterally asymmetrical tensile member 34, so that it presses more firmly against the windshield 30 for more effective wiping thereof. Specifically, the leaning angle has a more compliant curve across the windshield 30 to more effectively maintain close contact with the glass.

Additionally, the rubber blade 31 is curved and fitted on the tensile member 34 so that it deviates from a straight line along with the tensile member 34, to maintain a perpendicular disposition on the vehicle's windshield, so that it more closely contacts the glass and has a more effective wiping ability.

Likewise, as shown in FIG. 10, the wiper of the present invention is capable of being interchanged with existing conventional wipers formed with frames or tensile members composing one-piece tension springs. By bending the adapter that fits on the wiper arm from the frame or tensile member, so that the frame or tensile member maintains a declination toward its leading edge with respect to the windshield, the frame or tensile member can function as a spoiler for oncoming air, eliminating the need for a separately fitted spoiler, and maintaining a stable contact with the windshield. Thus, areas of the blade not contacting the windshield can be prevented, and a secure contact between the blade and glass can be maintained for superior wiping performance. Noise caused by judder can also be prevented.

The wiper according to the present invention, having an adapter portion that attaches to the wiper arm bent from a frame functioning as a tension spring for maintaining the frame at a certain angle relative to a windshield, so that the frame can function as a spoiler for oncoming air. Also, because the adapter is disposed at an angle of deflection that positions a wiper blade attached thereto at an angle other than 90° with respect to the windshield, the sectional profile of the rubber blade is disposed at an angle close to 90° with respect to the windshield, so that the blade closely and securely contacts the windshield for maintaining a superior wiping ability. Furthermore, the blade is curved and mounted to the frame so that the blade rests more securely on the windshield than if it were straight and maintains an angle close to 90° between the blade and the windshield for a close contact therebetween. By bending the adapter of a conventional wiper and forming the frame and tension spring in a single piece, the improved wiper of the present invention has a wide applicability.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. An automotive wiper comprising:
   a frame supporting a blade which is adapted to closely contact a surface of an automotive windshield and is attached to a wiper arm for pressing and operating the wiper against and across the windshield via an adapter, and
   a tension spring having a predetermined tension and inserted along a rail portion of the blade for evenly distributing load along the blade onto the windshield,
   wherein said adapter is disposed perpendicularly to a longitudinal axis of the frame at a central portion thereof for a wiper arm mounted to a first arm which is longer than a second arm connected to said frame, the frame is maintained to be offset by an angle θ from a horizontal axis taken at a sectional view of the wiper with respect to the adapter, whereby the adapter is offset by an angle θ1 from a perpendicular axis of the wiper with said adapter having a width larger than a tensile member opposite said adapter due to an offset of the frame and the adapter the blade is adapted to be pressed against and to maintain substantially perpendicular to the surface of the automotive windshield, in operation.

2. The wiper of claim 1, wherein the frame includes a leading edge that is adapted to be disposed closer to the windshield than a trailing edge of the frame when the frame is pressed against the windshield, and the adapter and the frame are selectively positioned at the offset angle θ1 between 5° to 50° with respect to the perpendicular axis.

3. An automotive wiper comprising:

a frame supporting a blade which is adapted to closely contact a surface of an automotive windshield and is attached to a wiper arm for pressing and operating the wiper against and across the windshield via an adapter, and a tension spring having a predetermined tension and inserted along a rail portion of the blade for evenly distributing load along the blade onto the windshield, wherein a tensile member is in the form of the tension spring and has two ends and a central portion between the two ends, said tensile member extending symmetrically to both said ends from the central portion, and formed in a single one-piece tension spring for mounting to a wiper arm, said adapter is disposed perpendicularly to a longitudinal axis of the tensile member at a central portion thereof for the wiper arm to mount to said adapter having a width larger than a tensile member opposite said adapter, in operation, the tensile member is maintained to be offset by an angle θ from a horizontal axis taken at a sectional view of the wiper with respect to the adapter, whereby the adapter is offset by an angle θ1 from a perpendicular axis of the wiper, and due to an offset of the tensile member and the adapter the blade is adapted to be pressed against the surface of the automotive windshield.

4. The automotive wiper of claim 3, wherein the tensile member includes a leading edge that is adapted to be disposed closer to the windshield than a trailing edge of the tensile member when the tensile member is pressed against the windshield, and the adapter and tensile member are selectively positioned at the offset angle θ1 between 5° to 50° with respect to the perpendicular axis.

5. The automotive wiper of claim 3, wherein a width of the tensile member-decreases from the central portion toward said each end and has a recess at the central portion for reducing negative pressure.

6. The automotive wiper of claim 3, wherein the blade mounted to the tensile member is laterally asymmetrical and offset from the perpendicular axis according to the offset angle θ1 of the tensile member.

7. The automotive wiper of claim 3, wherein the blade is curved and attached to the tensile member for maintaining a substantially vertical disposition of the blade with respect to the windshield and close contact with the windshield.

8. An automotive wiper comprising:

a frame supporting a blade that is adapted to closely contact a surface of an automotive windshield and being attached to a wiper arm for pressing and operating the wiper against and across the windshield via an adapter, and a tension spring having a predetermined tension and inserted along a rail portion of the blade for evenly distributing load along the blade onto the windshield, wherein a tensile member is in the form of the tension spring and has two ends and a central portion between the two ends, said tensile member extending symmetrically to both said ends said central portion and formed in a single one-piece tension spring for mounting to the wiper arm; and said adapter is disposed perpendicularly to a longitudinal axis of the tensile member at said central portion for the wiper arm to mount to said adapter having a width larger than a tensile member opposite said adapter, the tensile member is maintained to be offset by an angle θ from a horizontal axis resulting from a first arm being longer than a second arm of said frame as taken at a sectional view of the wiper with respect to the adapter, whereby the adapter is offset by an adjustable angle θ1 from a perpendicular axis of the wiper, due to an offset of the tensile member and the adapter the blade is pressed against the automotive windshield, and the blade is curved to deviate by an angle θ2 from a straight longitudinal axis thereof and maintains a substantially perpendicular angle with respect to the windshield and close contact with the windshield in operation, despite being offset from the perpendicular in conjunction with the tensile member.

9. The automotive wiper of claim 8, wherein the tensile member that is a single piece wiper frame includes a leading edge that is adapted to be disposed closer to the windshield than a trailing edge of the tensile member when the tensile member is pressed against the windshield, and the adapter and tensile member are selectively positioned at the offset angle θ1 between 5° to 50° with respect to the perpendicular axis.

10. The automotive wiper of claim 8, wherein a width of the tensile member decreases from the central portion toward said each end and has a recess at the central portion where the adapter is located.

* * * * *